March 1, 1932.　　　S. I. SEMEL　　　1,847,988
CAMERA
Filed Oct. 25, 1929　　4 Sheets-Sheet 1
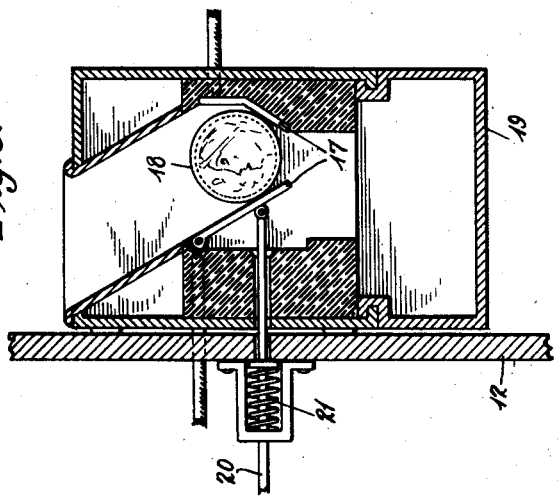
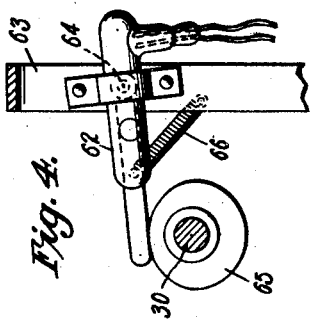
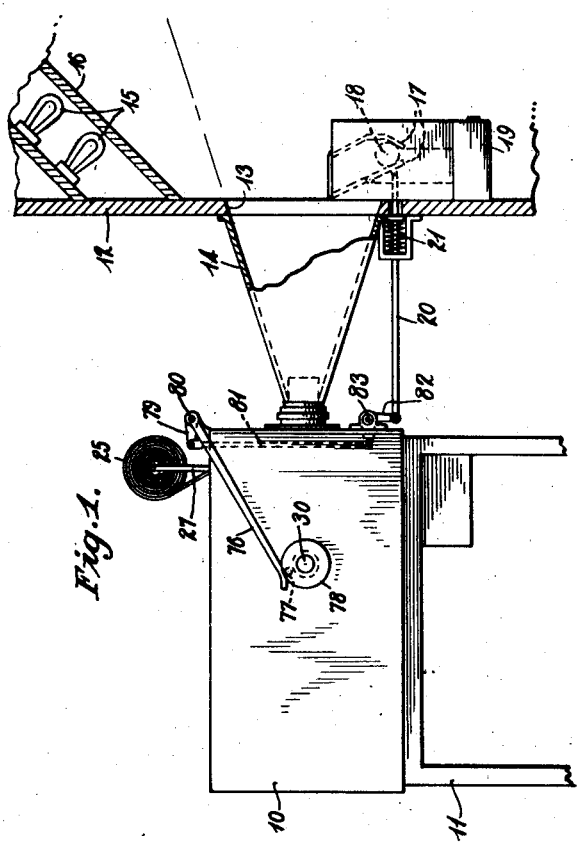
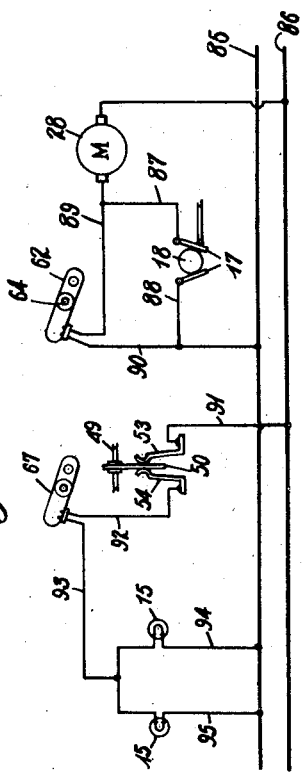
Inventor
Samuel I. Semel

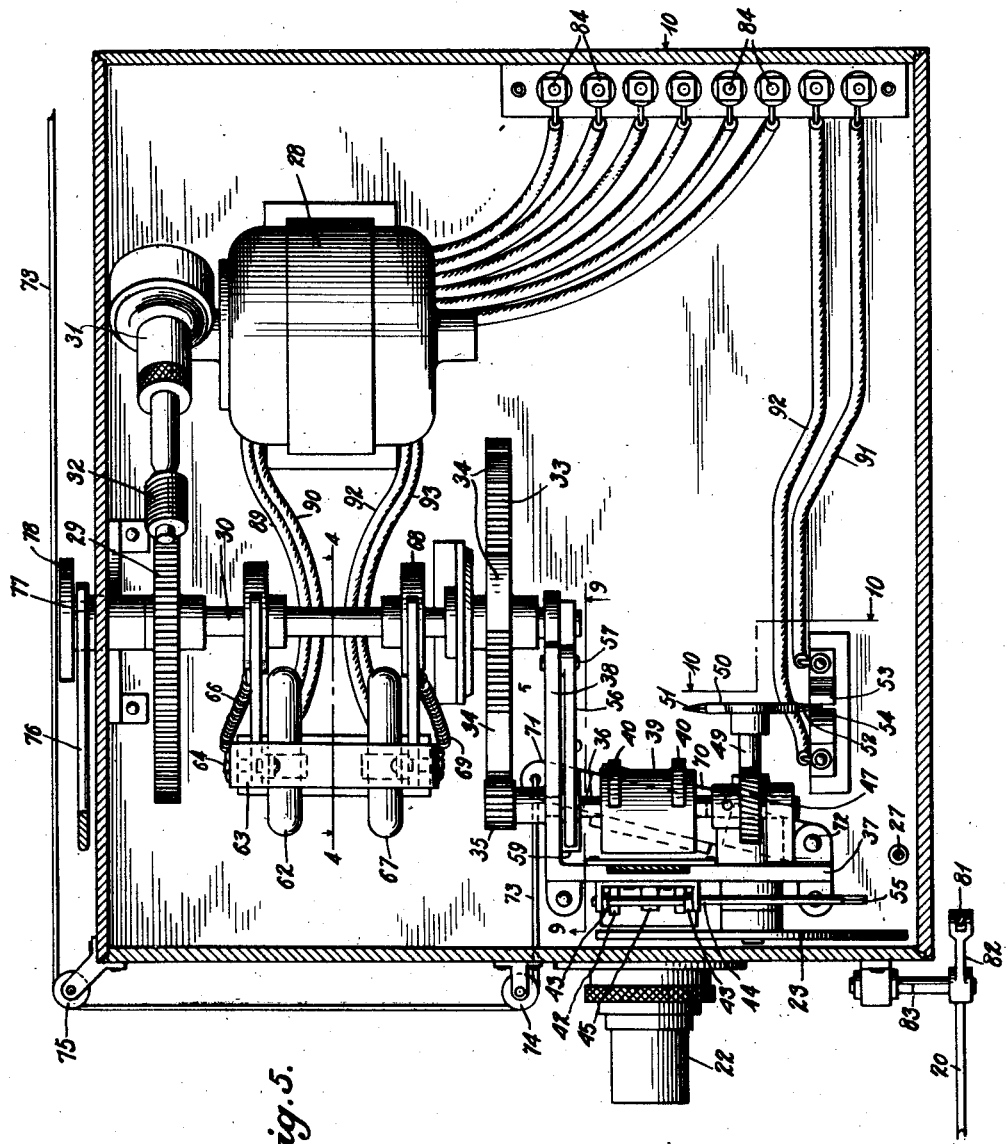

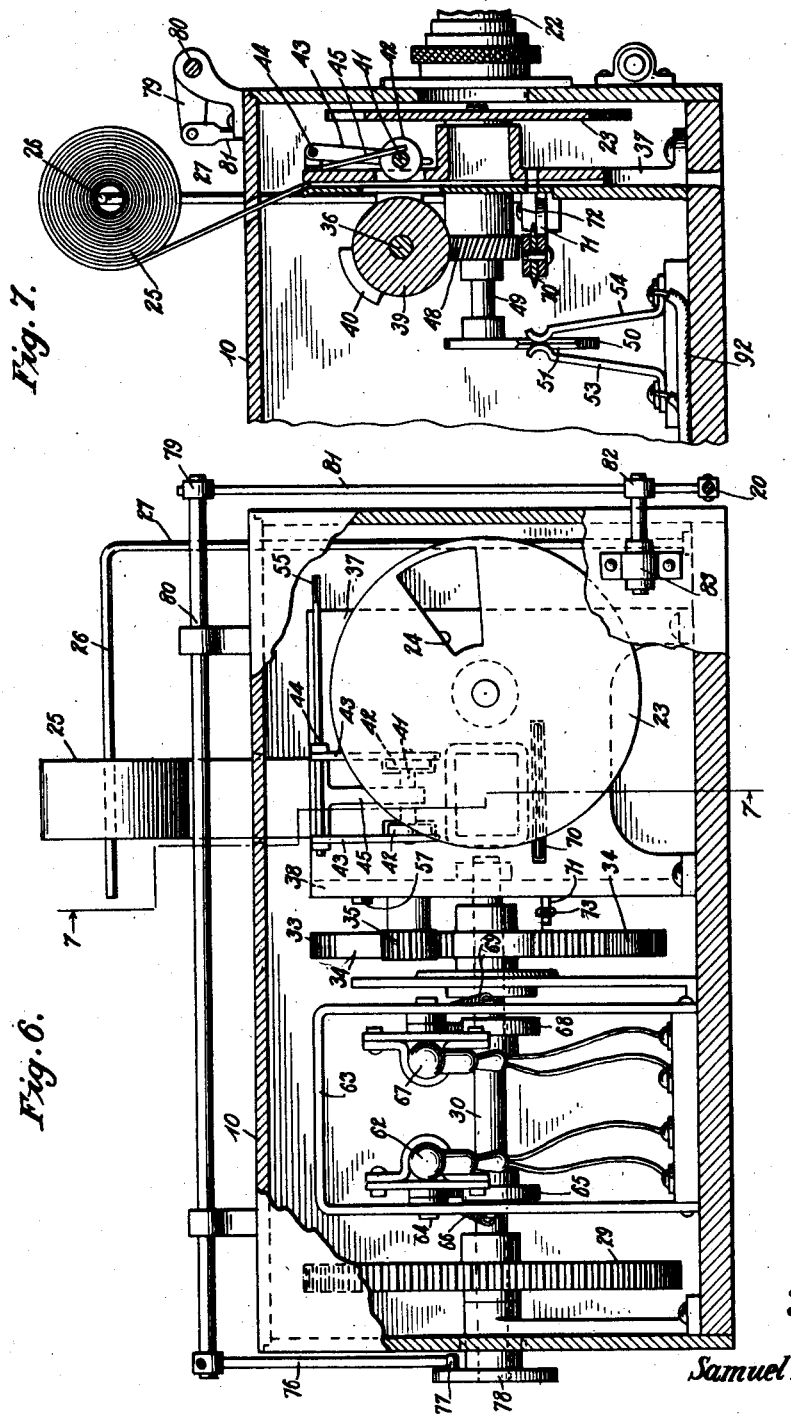

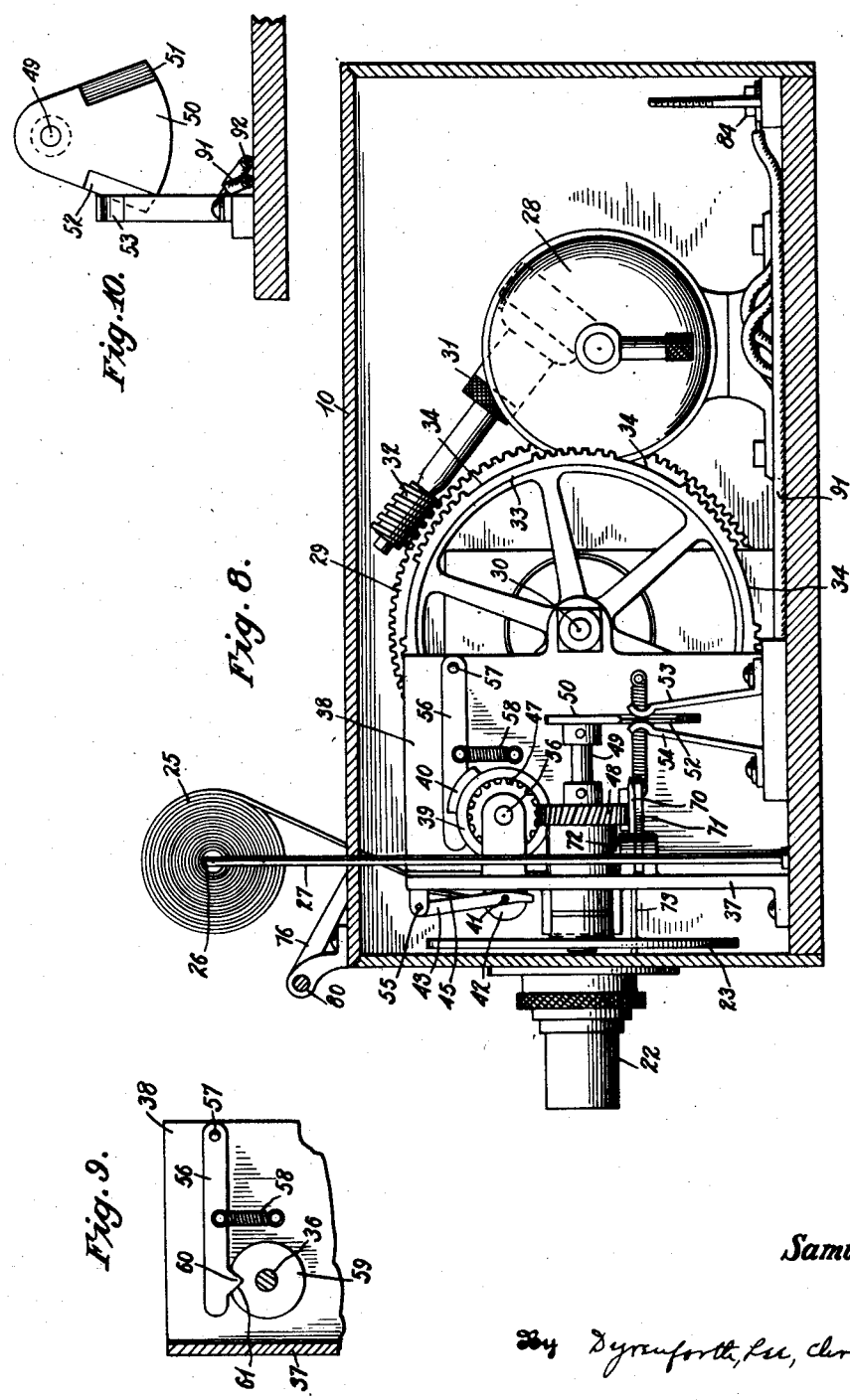

Patented Mar. 1, 1932

1,847,988

UNITED STATES PATENT OFFICE

SAMUEL I. SEMEL, OF BROOKLYN, NEW YORK

CAMERA

Application filed October 25, 1929. Serial No. 402,434.

The invention relates to cameras of the automatic type and has as an object the provision of a camera which when set into operation will make a predetermined series of exposures.

It is a further object of the invention to provide a camera which will make a predetermined number of exposures and wherein said camera is combined with a source of illumination to illuminate the object to be photographed and wherein said illumination is cut out after each exposure as a signal that the pose of the object being photographed may be shifted.

It is a further object of the invention to provide a camera having the characteristics set forth which may be utilized as a coin operated camera.

Further objects of the invention will appear from the following description when read in connection with the accompanying drawings showing an illustrative embodiment of the invention and wherein:—

Fig. 1 is a detail vertical section through a portion of a photograph cabinet showing a side elevation of the camera of the invention;

Fig. 2 is a diagram of circuits;

Fig. 3 is a central vertical section through a starting switch drawn to an enlarged scale;

Fig. 4 is a detail side elevation of a control switch;

Fig. 5 is a plan view showing the casing in section;

Fig. 6 is a view from the left in Fig. 5 with the front board carrying the lens broken away;

Fig. 7 is a vertical section on line 7—7 of Fig. 6;

Fig. 8 is a side view of the device taken from the left of Fig. 6;

Fig. 9 is a detail side view of a stop mechanism; and

Fig. 10 is a detail end view of the light circuit interrupting switch.

As shown the device comprises a camera which may be housed in a casing 10 upon a suitable support 11 and placed in a light-tight photograph cabinet the front wall of which is indicated in section at 12. The exposure by the camera is designed to be made through the opening 13 in the partition 12, a cone 14 being provided to connect the lens with the opening to exclude light from the interior of the cabinet. For illumination of the object or person to be photographed, there are shown lamps 15 desirably placed behind a ground glass 16.

To initiate the operation of the camera a starting switch 17 is shown within the reach of a person to be photographed by the camera exterior of cabinet 12 and below the illuminating lights 15. The starting switch 17 may be any type of switch which may be held closed by the operator for a short space of time or it may be any well known type of switch which is momentarily and automatically held closed.

In the embodiment of the invention shown the switch is illustrated as a coin operated switch wherein the circuit is closed through an inserted coin 18 which may be precipitated into a box 19 when rod 20 is retracted against the pressure of spring 21 by mechanism of the camera to be described.

The camera as shown comprises a lens 22 and a power driven shutter 23 having, as shown, a single exposure opening 24. A supply roll of sensitized material is shown at 25 supported upon a rod 26 carried by a standard 27.

To drive the entire mechanism of the camera, there is shown a motor 28 housed in the casing 10 driving mechanism through a master gear 29 mounted upon a shaft 30 through the medium of a reducing gear 31 and a worm drive 32.

To drive the shutter, the sensitive strip feeding means, and the light circuit interrupter, there is shown a gear wheel 33 having gaps 34 in its gear teeth in one of which gaps the driven pinion 35 stands when the device is at rest. The object of the described position of rest is to allow the motor to get up speed before the shutter is first thrown into operation whereupon the first exposure will be no longer than subsequent exposures. The position of these gears shown in Figs. 5 and 6 is just prior to the cessation of movement of the mechanism.

The pinion 35 is shown as secured to a shaft 36 journaled in a standard 37, 38 mounted upon the baseboard of the casing. To feed the sensitized material between exposures thereof by shutter 23, there is shown a friction wheel 39 having arcuate lugs 40 thereon to come into contact with the sensitized material 25 and to step the same forwardly the distance of one exposed portion. To grip the sensitized material 25 against the lugs 40, there is shown a shaft 41 having friction wheels 42 thereon, which shaft 41 is journaled in a swinging frame 43 pivoted at 44 to the portion 37 of the standard, a spring 45 being provided to resiliently press the wheels 40 toward the sensitized strip.

To drive the shutter 23, a worm wheel 47 is shown keyed upon shaft 36 engaging a worm wheel 48 upon shaft 49 upon which the shutter is mounted. To interrupt the circuit to the lamps 15 between exposures, there is shown a segment of insulating material 50, also secured upon shaft 49, having its edges beveled as at 51, 52 to pass between contact members 53, 54 connected in the lighting circuit.

To retract the friction wheels 42 when it is desired to thread the sensitized strip into the device, the end of the shaft 44 is shown as squared at 55, Fig. 5, upon which squared end a crank or wrench may be applied for the purpose of turning the shaft against the pressure of spring 45.

To accurately stop the movement of the mechanism after the predetermined number of exposures have been made and to bring the parts to the same position at each stop, there is shown an arm 56 pivoted at 57 on the portion 38 of the standard and spring pressed by means of a tension spring 58 against a notched disc 59, a point 60 carried by the arm falling into a notch 61 upon the disc for the purpose mentioned.

To control the motor circuit after its initial closure and reopening by switch 17, there is shown a mercury switch 62 of any well known type which operates by tilting a tube containing a drop of mercury, the said tube being pivoted upon standard 63 as at 64 and being tilted about said pivot by an eccentric wheel 65 carried upon shaft 30 against the tension of spring 66. A like switch 67 pressed against a second eccentric 68 by spring 69 is also shown pivoted upon the standard 63 for control of the light circuit.

To manually sever the strip of sensitized material after the exposures have been made, there is shown a knife 70 carried by lever 71 pivoted at 72 which may be pulled to contact with the sensitized material by means of a flexible member 73 passing about pulleys 74, 75 to the rear of the casing.

Means are shown whereby the starting switch 17 may be opened by the first movement of the motor when the making of the exposures is initiated. In the embodiment shown this means takes the form of mechanism for dropping the coin 18 into the box 19, and for this purpose there is illustrated a lever 76 adapted to be raised by pin 77 carried by a disc 78 keyed upon shaft 30 and shown as mounted upon said shaft upon the exterior of the casing. The lever 76 through a bell crank 79 pivoted at 80 upon the casing lifts link 81 connected to a bell crank 82 pivoted at 83 whereby to pull upon rod 20.

A plurality of binding posts 84 are shown for convenient connection of the wiring to switch 17, to the power line, and to lamps 15.

The circuits for operation of the device are shown in Fig. 2 and comprise the power wires 85, 86, the circuit for the motor being from wire 86, motor, wire 87, switch 17, wire 88 to wire 85, also from motor 28 through wire 89 to mercury switch 62, wire 90 to wire 85. The switch 17 is seen to be in shunt of the switch 62.

For control of the lamps wire 86 is connected by wire 91 to contact 53, 54, wire 92 to mercury switch 67, wire 93 to lamps 15 in parallel wires 94, 95 to wire 85; the contacts 53, 54 being in series with the switch 67.

In operation of the device when used as a camera for taking photographs of individuals, the individual places himself before the opening 13 in the cabinet and operates the switch 17, in the form shown by inserting a coin in the coin slot whereupon the motor is set into operation and after the motor has gathered speed the lights are turned on and the first exposure is made. The lights are then interrupted which may be taken as a signal to the person being photographed or to an attendant to change the pose of the object. The predetermined number of exposures are made in this manner after which the device is accurately stopped by means of arm 56 and disc 59. An attendant within the cabinet then severs the strip by pulling upon cable 73 and removes the severed and exposed portion of the strip for development and printing.

Minor changes may be made in the physical embodiment of the invention within the scope of the appended claims without departing from the spirit thereof.

I claim:

1. A camera comprising, in combination, a lens, a shutter, means for intermittently feeding a strip of sensitized material through the field of said lens, a motor for driving said means, a manually operated starting switch for said motor, a switch in shunt of said first named switch closed by said motor, means to hold said last named switch closed during a series of exposures and to open the same after a definite number thereof, illuminating means for the object to be photographed, a switch for said illuminating means controlled by said motor and means actuated by the motor to interrupt circuit through said illuminating means after each of said series of exposures of the sensitized material by action of said shutter.

2. A camera comprising, in combination, a rotary shutter and a lens, means to feed a supply strip of sensitized material through the field of said lens, means to drive said shutter and feeding means comprising a motor, a shaft driven by said motor, a gear wheel keyed upon said shaft, said gear wheel having a series of separated groups of teeth, a pinion meshing with said groups of teeth in turn, said pinion mounted on a shaft geared to operate said shutter and feeding means, the mechanism so geared that each group of teeth cause a single revolution of the shutter and one operation of the feeding means.

3. A camera comprising, in combination, a shutter and a lens, a motor for operation of said shutter, means operated by said motor to feed a strip of sensitized material intermittently through the field of said lens, a manually operated switch for starting said motor, a driven shaft actuated by the motor for drive of said shutter and strip feed, a cam keyed upon said shaft, a mercury switch pivotally mounted adjacent said cam, means actuated by said cam for actuation of said mercury switch, said mercury switch arranged in shunt of said manually operated switch and means actuated by the motor to break the circuit through said manually operated switch.

4. A camera comprising, in combination, a lens and a rotary shutter, a motor and mechanism for operation of said shutter from said motor comprising a driven shaft, a manually operated switch for starting said motor, a control switch for said motor in shunt of said manually operated switch, an eccentric on said shaft for actuation of said control switch, a source of light for illumination of the object to be photographed, a control switch for said source of light pivoted adjacent said shaft, an eccentric on said shaft for actuation of said light switch, and means actuated by the shutter drive mechanism for interrupting the illumination of said source of light.

5. A camera comprising, in combination, a lens and a rotary shutter, a shaft for actuation of said shutter, a worm gear on said shaft, a shaft and worm wheel for drive of said gear and shutter, means mounted upon said last named shaft to feed sensitized material through the field of said lens, a driven pinion upon said last named shaft, a drive gear having separated groups of teeth thereon to mesh with said driven pinion to drive said shutter and feed means intermittently, power means to drive said last named gear, an electric lamp for illumination of the object to be photographed, a switch controlled by said power means for control of said light means, a pair of normally engaging contacts in the circuit of said lamp, a segment of insulation material mounted on said shutter shaft adapted to separate said contacts after each exposure of the sensitized material by the shutter to interrupt the action of said lamp.

6. A camera comprising, in combination, a lens, a rotary shutter, means to feed a strip of sensitized material through the field of said lens, a motor geared to operate said shutter and feeding means, a manually operated switch for starting said motor, a link for opening said switch, a disc operated by said motor, a pin carried by said disc, a lever to be contacted by said pin during the first movement of said motor, means for actuation of said link to open the switch by movement of said lever, a control switch for the motor in shunt of said manually operated switch and means for closing said control switch by the motor prior to the opening of the manually operated switch thereby.

7. A camera comprising, in combination, a lens, a rotary shutter, means to feed sensitized material through the field of said lens, an electric lamp for illumination of the subject to be photographed, a motor for driving said parts, means controlled by the motor to close the circuit through said lamp, means actuated by the motor to interrupt the circuit through said lamp after each exposure of the sensitized material, said drive means geared to provide a predetermined number of exposures, means to accurately stop the mechanism with the shutter and drive means in a predetermined position and manually operated means to sever the exposed portion from the supply of sensitized material.

SAMUEL I. SEMEL.